J. E. WAGGONER.
PRESSURE COOKER.
APPLICATION FILED MAR. 20, 1918.
1,337,981. Patented Apr. 20, 1920.
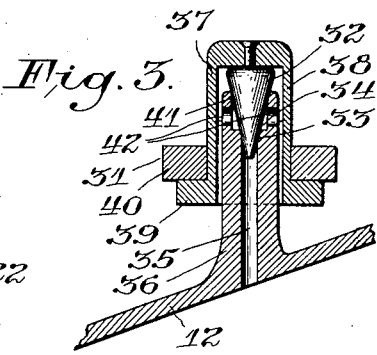
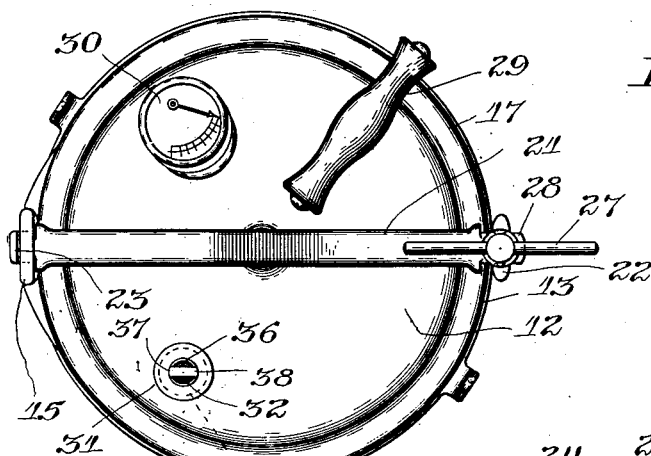
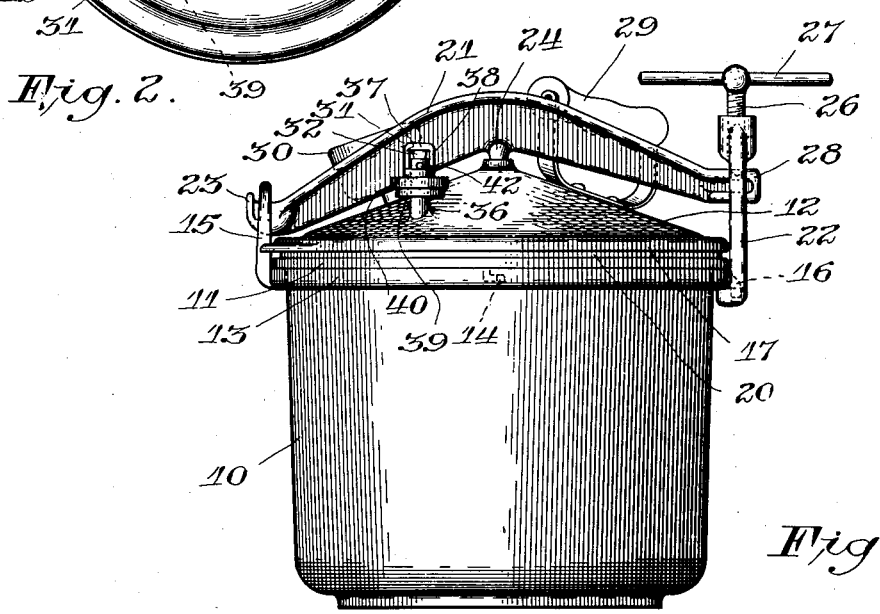
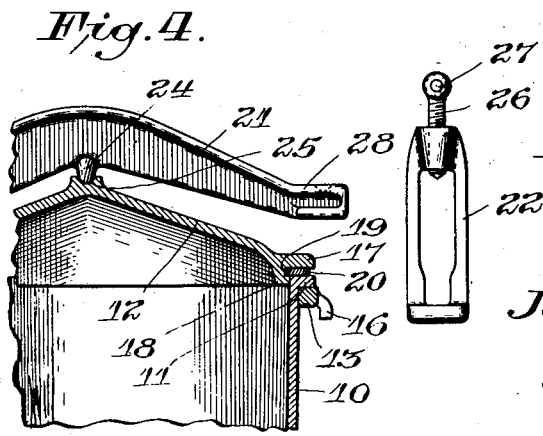
Inventor:
Jacob E. Waggoner,
By Chas. E. Lord
Att'y.

UNITED STATES PATENT OFFICE.

JACOB E. WAGGONER, OF CHICAGO, ILLINOIS, ASSIGNOR TO HALFTIME COOKER COMPANY, OF CHICAGO, ILLINOIS, A CORPORATION OF ILLINOIS.

PRESSURE-COOKER.

1,337,981.  Specification of Letters Patent.  Patented Apr. 20, 1920.

Application filed March 20, 1918. Serial No. 223,556.

*To all whom it may concern:*

Be it known that I, JACOB E. WAGGONER, a citizen of the United States, residing at Chicago, in the county of Cook and State of Illinois, have invented certain new and useful Improvements in Pressure-Cookers, of which the following is a full, clear, and exact specification.

My invention relates to the class of cooking vessels in which a self-generated pressure of steam is maintained for the purpose of expediting the cooking operation, and effecting an economy in fuel consumed.

The object of my invention is to simplify the construction of the cooker, and to render it more convenient and effective for use in cooking large or small articles of food, or for use during canning or preserving operations.

In carrying out the object of my invention I employ a novel cooking utensil provided with an improved sealing cover and pressure controller. The novel features will be described in the following specification, and more particularly pointed out in the appended claims.

In the accompanying drawings, which form part of the specification—

Figure 1 represents a side elevation of my improved pressure cooker;

Fig. 2 is a plan view of the cooker shown in Fig. 1;

Fig. 3 is a sectional elevation of the pressure controlling valve;

Fig. 4 is a sectional detail of the cover seal showing part of the cover clamping means in elevation; and, Fig. 5 is a side elevation of the adjustable link of the clamping means shown in Fig. 1.

Referring to the drawings, the body portion or receptacle 10 of the pressure cooker is shaped, in general, like an ordinary cooking kettle. Upon this body portion, which is preferably made of aluminum, may be placed the sealing cover 12, also of aluminum.

The body portion is provided with an outwardly extending flange 11, adjacent to its upper edge. As it is difficult to hold the aluminum cover to its seat on said flange when relatively high pressures are used in the cooker, I have provided a removable ring 13 of steel or other strong material, which is held in position against the under side of this flange 11 by any desired means, such as the bayonet joint shown in dotted lines at 14. This ring is provided on one side with the upwardly extending loop 15, and on the opposite side with the hooked shaped lug 16. The cover 12 is provided with an annular outwardly extending flange 17 and a depending flange 18. As shown in Fig. 4, the flange 17 has an annular grove 19 containing the resilient gasket or packing material 20. This gasket and groove are so proportioned that the gasket remains in position on the cover when the cover is removed from the receptacle.

The cover is held in position on the receptacle 10 by means of a clamping device comprising the yoke 21, and the adjustable link 22. The hooked end 23 of the yoke 21 engages and is fulcrumed on the loop 15, while the projection 24 on its middle portion engages a recess 25 in the top of the cover. The upper end of the link 22 carries the screw 26, which rests upon the free end 28 of the yoke. The lower end of the link engages the hook-shaped lug 16. The screw 26 is provided with a handle 27, and when the detachable steel yoke and link are placed in position, and the screw is rotated by the handle 27, the free end of the yoke is forced toward the receptacle and the cover is clamped in position with great pressure. The cover is also provided with a handle 29, a pressure gage 30, and a pressure controlling valve 31.

The pressure controlling valve 31 comprises a movable conical valve member 32, which rests on the conical valve seat 33 formed in the enlarged upper portion 34 of the opening 35 in the tubular projection 36 on the cover 12. Suspended from the movable valve member 32 by means of the straps 37 and 38, and surrounding said tubular projection, is an annular platform 39, upon which one or more annular weights 40 may be placed. The enlarged portion 34 has a conical guide surface 41 at its upper end to coöperate with the valve member 32. A plurality of vent openings 42, to permit the escape of steam when the valve member is moved off its seat, are provided in the tubular extension.

In operating the cooker a predetermined amount of water, together with the material to be cooked, canned or preserved, is placed within the body portion or receptacle, and the cover is placed in position thereon. The yoke 21 is then placed in position with its hooked end fulcrumed in the loop 15 on the steel ring, and its middle portion resting on the top of the cover. The link 22 is then hooked under the lug 16, and the lower end of screw 26 brought into contact with the free end 28 of the yoke. The screw is then rotated by means of the handle 27 and the free end of the yoke forced downwardly, and the cover forced into position, compressing the gasket 20 to make a steam tight joint. The movable member 32 of the valve 31 is then placed in position, and enough annular weights 40 added to determine the limit of pressure within the cooker. The proper amount of heat is then applied, either continuously or intermittently, to the cooker to generate and maintain any desired pressure indicated upon the pressure gage. If the pressure becomes too great, the valve operates to relieve the pressure.

When the operation of cooking or canning is completed, the pressure is relieved by permitting the steam to escape through the valve. After the pressure has gone down, and not before, the cover may be released by removal of the clamping means.

Many modifications may be made in the details of construction of my improved pressure cooker without departing from the spirit of my invention, or its scope, as set forth in the appended claims.

What I claim as new is:

1. In a pressure cooker, a receptacle provided with an outwardly extending flange, a cover for said receptacle, a readily detachable ring engaging the under surface of said flange, a detachable yoke having its middle portion bearing against the top of said cover and having one end fulcrumed upon an extension of said ring at one side of said receptacle, a readily detachable link for connecting said ring and the other end of said yoke at the opposite side of said receptacle, and a screw carried by said link and bearing against the end of said yoke, and adjustable to force the end of said yoke toward the ring to clamp the cover in place.

2. In a pressure cooker, a receptacle provided with an outwardly extending annular flange at its upper edge, a cover for said receptacle, a separate reinforcing ring engaging the under surface of said flange, a detachable yoke member having its middle portion bearing against the top of said cover and having one end operatively connected to said reinforcing ring at one side of the receptacle, a link member for connecting said reinforcing ring to the other end of said yoke member at the opposite side of said receptacle, and a screw carried by said link member and bearing against the end of said yoke member which projects into said link member, and a handle on said screw whereby the screw may be adjusted to force the end of the yoke member toward the reinforcing ring to clamp the cover in place on the receptacle.

In testimony whereof I affix my signature.

JACOB E. WAGGONER.